United States Patent
Nory et al.

(10) Patent No.: US 10,009,153 B2
(45) Date of Patent: Jun. 26, 2018

(54) APPARATUS AND METHOD FOR RECEPTION AND TRANSMISSION OF CONTROL CHANNELS

(71) Applicant: MOTOROLA MOBILITY LLC, Chicago, IL (US)

(72) Inventors: Ravikiran Nory, Buffalo Grove, IL (US); Vijay Nangia, Algonquin, IL (US); Murali Narasimha, Vernon Hills, IL (US); Ajit Nimbalker, Buffalo Grove, IL (US)

(73) Assignee: Motorola Mobility LLC, Chicago, IL (US)

(*) Notice: Subject to any disclaimer, the term of this patent is extended or adjusted under 35 U.S.C. 154(b) by 73 days.

(21) Appl. No.: 14/733,980

(22) Filed: Jun. 9, 2015

(65) Prior Publication Data

US 2016/0226637 A1  Aug. 4, 2016

Related U.S. Application Data

(60) Provisional application No. 62/110,404, filed on Jan. 30, 2015.

(51) Int. Cl.
*H04L 5/00* (2006.01)
*H04W 72/04* (2009.01)
(Continued)

(52) U.S. Cl.
CPC ............ *H04L 5/001* (2013.01); *H04L 5/008* (2013.01); *H04L 5/0053* (2013.01);
(Continued)

(58) Field of Classification Search
CPC . H04L 5/0053; H04L 27/2602; H04L 5/0048; H04L 5/0051; H04L 27/0006; H04W 16/14
See application file for complete search history.

(56) References Cited

U.S. PATENT DOCUMENTS

| | | | |
|---|---|---|---|
| 8,401,542 B2* | 3/2013 | Chung | H04L 5/0007 370/485 |
| 2011/0044259 A1* | 2/2011 | Nimbalker | H04L 5/001 370/329 |

(Continued)

FOREIGN PATENT DOCUMENTS

WO    2016072717 A1    5/2016

OTHER PUBLICATIONS

Nokia Networks, Nokia Corporation: "On Listen Before Talk and Channel Access", 3GPP TSG RAN WG1 Meeting #79, R1-145003, San Francisco, USA, Nov. 17-21, 2014, all pages.

(Continued)

*Primary Examiner* — Yemane Mesfin
*Assistant Examiner* — Henry Baron
(74) *Attorney, Agent, or Firm* — Matthew C. Loppnow; The Watson I.P. Group, PLC

(57) ABSTRACT

A method and system of creating, transmitting, receiving and interpreting a subframe structure used in the communication between a base station and a device with mobile communication functionality is provided for use during communication on an unlicensed frequency spectrum. The system and subframe structure provides for the truncation of OFDM symbols within one or more subframe structures that often contain downlink control information and a method for determining a new location of the truncated downlink control information within the subframe structure.

18 Claims, 5 Drawing Sheets

(51) Int. Cl.
*H04L 27/26* (2006.01)
*H04W 16/14* (2009.01)
*H04L 5/14* (2006.01)

(52) U.S. Cl.
CPC ........ *H04L 27/2602* (2013.01); *H04L 5/0051* (2013.01); *H04L 5/1469* (2013.01); *H04W 16/14* (2013.01); *H04W 72/042* (2013.01); *H04W 72/0446* (2013.01)

(56) References Cited

U.S. PATENT DOCUMENTS

| | | |
|---|---|---|
| 2014/0036853 A1 | 2/2014 | Kim |
| 2014/0126496 A1 | 5/2014 | Sayana et al. |
| 2014/0192730 A1 | 7/2014 | Seo |
| 2016/0143014 A1* | 5/2016 | Mukherjee ........ H04W 74/0816 370/330 |

OTHER PUBLICATIONS

Nokia Corporation, Nokia Networks: "LAA LBT operation using Reservation signals", 3GPP TSG RAN WG1 Meeting #79, R1-145004, San Francisco, US, Nov. 17-21, 2014, all pages.
Qualcomm Incorporated: "Solutions for required functionalities and design targets", 3GPP TSG RAN WG1 #78bis, R1-144000, Oct. 6-10, 2014, Ljublijana, Slovenia, all pages.
Qualcomm Incorporated: "Small cell on/off time reduction", 3GPP TSG-RAN WG1 #76, R1-140452, Feb. 10-14, 2014, Prague, Czech Republic, all pages.
Huawei, HiSilicon: Further analysis on the required functionalities for LAA, 3GPP TSG RAN WG1 Meeting #79, R1-144590, San Francisco, USA, Nov. 17-21, 2014, all pages.
Tanbourgi, International Search Report, International Application No. PCT/US2016/012932, European Patent Office, dated Jul. 5, 2016, Rijswijk, NL.
"3rd Generation Partnership Project; Technical Specification Group Radio Access Network; Small cell enhancements for E-UTRA and E-UTRAN—Physical layer aspects (Release 12)", 3GPP Standard; 3GPP TR 36.872, 3rd Generation Partnership Project (3GPP), Mobile Competence Centre; 650, Route Des Lucioles; F-06921 Sophia-Antipolis Cedex; France, vol. Ran WG1, No. V12.1.O, Dec. 19, 2013.

* cited by examiner

APPARATUS AND METHOD FOR RECEPTION AND TRANSMISSION OF CONTROL CHANNELS

TECHNICAL FIELD

The following disclosure relates to wireless telecommunication transmissions of Long Term Evolution (LTE) type communication signals. In particular, the following disclosure relates to approaches for truncating transmissions in the LTE subframe signal and signaling options for the transmission of control channels and reference signals.

BACKGROUND

LTE Advanced is being considered for deployment in the unlicensed spectrum in the 5 GHz band. To do so, licensed spectrum in the range 400 MHz to 3.8 GHz and spectrum in the unlicensed spectrum bands would be aggregated together similar to the way that the licensed spectrum bands are treated in standard LTE Advanced carrier aggregation (CA). Regulatory authorities around the world have defined or are defining a wide variety of requirements so that various systems can inter-operate with incumbent users in the unlicensed bands, notably including WiFi deployments.

For LTE Advanced (LTE Rel10-12) carrier aggregation (CA) or Dual Connectivity, an eNB (E-Utran Node B) may be used. An eNB is connected to a mobile phone network that communicates with mobile handsets (UEs) and that configures a secondary serving cell (Scell) to the UE to provide additional frequency resources (i.e., a secondary carrier or a secondary component carrier (CC)) for communication in addition to the primary serving cell (Pcell). The Scell is typically activated for a UE at the onset of a data burst transmission for the UE and deactivated after the transmission is complete. Activation is done by using an activation command MAC layer control element (MAC CE). Deactivation is done either upon expiry of a deactivation timer or by using an explicit deactivation command MAC CE. Additionally, a UE operating in LTE Advanced (LTE Rel12) network can expect at least discovery signals from the eNB on the Scell carrier while the carrier is deactivated. After receiving an activation command for the Scell, the UE expects cell specific reference signal (CRS) transmission from the eNB on the Scell carrier from the subframe where activation command is received till the subframe where the Scell is deactivated.

For further Advanced LTE (LTE Rel13) Scell, operation on unlicensed carriers continues to be studied. The initial focus of the studies appears to be Scell operation via a CA mechanism. However, it has been perceived that some of the procedures identified for CA can also be reused for dual connectivity (i.e., when the Scell and Pcell belong to different cell groups).

Due to regulatory requirements, and due the need to for Advanced LTE to co-exist with other wireless systems (e.g., Wi-Fi), LTE devices (i.e., UEs and eNBs) need to take the following issues into account while operating on an unlicensed carrier frequency.

First, before transmitting on an unlicensed carrier, the LTE devices (e.g., eNB) typically have to check whether the carrier (i.e., the carrier frequency) is busy using some form of 'listen before talk' (LBT) mechanism, then an LTE device can begin transmissions only if the carrier is free. LBT typically comprises measuring the energy on the carrier (sometimes referred to as sensing) for a short duration (e.g., 9 us or 20 us) and determining whether the measured energy is less than a threshold (e.g., −82 dBm or −62 dBm). If the energy is less than the threshold, the carrier is determined to be free. Some examples of LBT include the CCA-ED (clear channel assessment-energy detect) and CCA-CS (clear channel assessment-carrier sense) mechanisms defined in IEEE 802.11 specifications, CCA mechanisms specified in ETSI EN 301 893 specification etc.

And, second, transmissions on the carrier typically also have to follow discontinuous transmission requirements (DCT requirements), i.e., the LTE device can continuously transmit for Xms (e.g., X=4 ms as per some regulations, up to 13 ms for some other regulations), after which it has to cease transmission for some duration (sometimes referred as idle period), perform LBT, and reinitiate transmission only if LBT is successful. The device may perform LBT towards the end of the idle period.

As such, what is needed is a modification to certain transmissions of LTE signals and on various channels that enable efficient wireless network operation in both the licensed and unlicensed carrier spectrums.

BRIEF DESCRIPTION OF THE DRAWINGS

For a more complete understanding, reference is now made to the following description taken in conjunction with the accompanying Drawings in which.

DETAILED DESCRIPTION

Figure 1:
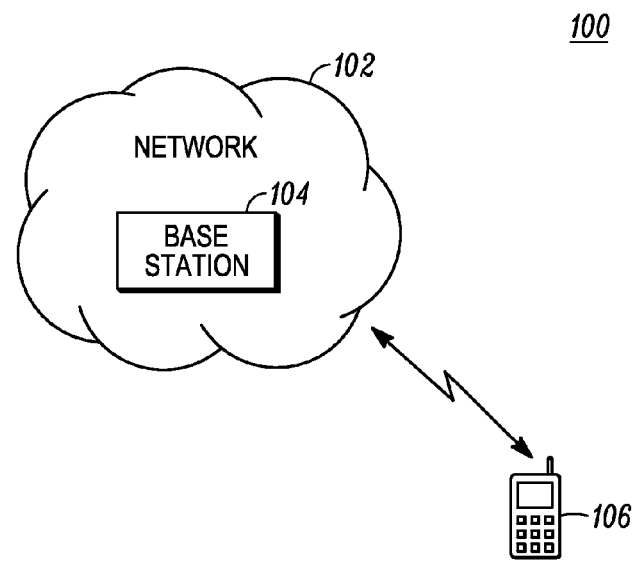
FIG. 1 illustrates a communications system in accordance with various invention embodiments.

Embodiments will now be described more fully hereinafter with reference to the accompanying drawings, in which various embodiments of the invention are shown. This invention may, however, be embodied in many different forms and should not be construed as limited to the embodiments set forth herein; rather, these embodiments are provided so that this disclosure will be thorough and complete, and will fully convey pertinent aspects of the invention to those skilled in the art.

As will be explained and discussed in more detail below, various embodiments provide enhancements or modifications to the creation and reception of LTE signals and channels in order to enable operation in both licensed and unlicensed frequency spectrums.

In one embodiment a method is provided for a UE to receive a subframe structure as a communication from a base station, such as an eNB. The method comprises the UE receiving a subframe in the subframe structure. The received subframe comprises a first time slot comprising a first plurality of OFDM symbols and a second time slot comprising a second plurality of OFDM symbols, wherein the first time slot and the second time slot are non-overlapping time slots. The UE monitors for downlink control information in a first set of control channel elements (CCEs) with the first n2 (1≤n2≤3) OFDM symbols of the first time slot. The UE also monitors for downlink control information in a second set of control channel elements with the first n2 (1≤n2≤3) OFDM symbols of the second time slot. The monitoring for downlink control information may be done in parallel (i.e., at the same time) or in series with the monitoring for downlink control information. The UE then determines resulting downlink control information from the monitoring of the first and second sets of CCEs.

In some embodiments the first plurality of OFDM symbols consists of seven OFDM symbols and the second plurality of OFDM symbols also consists of seven ODFM symbols. In some embodiments, the downlink control information in the second set of CCEs is determined to be the resulting downlink control information when the subframe is a subframe with truncation, which includes at least one of the first plurality of OFDM symbols in the first time slot.

Additionally in various embodiments, receiving of the subframe structure further comprises receiving the subframe from a serving cell in an operating channel of an unlicensed frequency band. Various embodiments may operate such that the resulting downlink control information from either the first or the second set of CCEs comprise resource allocation information prescribing an allocation of resources for Physical Downlink Shared Channel (PDSCH) reception.

In embodiments wherein the resulting downlink control information is determined to be from the monitoring for downlink control information in the second set of CCEs, then the second set of CCEs comprises resource allocation information allocating resources in the second plurality of OFDM symbols in the second time slot. In some embodiments the monitoring for downlink control information in the second set of CCEs is only done when the monitoring for control information in the first set of CCEs in the first slot fails to find any downlink control information therein. Alternatively, in some embodiments wherein the determined resulting downlink control information is from the monitoring for control information in the first set of CCEs within the OFDM symbols in the first time slot, the resource allocation information can comprise resource allocation information prescribing an allocation of resources in another plurality of OFDM symbols that are in a second subframe that occurred immediately prior to the subframe from which the resource allocation information was in.

In various embodiments the determined resulting downlink control information is from monitoring downlink control information in the first set of the CCEs within the first OFDM symbols of the first time slot and wherein the resulting downlink control indication comprises an indication value that indicates that the subframe is a subframe control indication with truncation and indicates a number of symbols in the truncated portion of the subframe.

Another embodiment provides a method for a base station to create a subframe structure used in communication between the base station and a UE wherein the subframe structure comprises a plurality subframes that each have a subframe duration. The method for the base station to create the subframe structure comprises the base station operating a serving cell on a carrier frequency. The base station performs a listen before talk (LBT) on the carrier frequency for a LBT time duration. The LBT time duration at least partially overlaps a terminal portion of a subframe duration of first subframe within the plurality of subframes in the subframe structure. The base station then determines where a position of a starting OFDM symbol for transmitting a control channel in a second subframe of the plurality of subframes should be placed based on the LBT time duration of the LBT and wherein the subframe duration of the second subframe occurs immediately after the subframe duration of the first subframe.

In various embodiments, the base station transmits the control channel starting from a determined position of the starting OFDM symbol in the second subframe when a result of the LBT time duration indicates that the carrier frequency is unoccupied during the terminal part of the terminal portion of the first subframe duration. Alternatively, the base station may transmit the control channel starting at the eighth OFDM symbol (or at the beginning of a second slot) of the second subframe when the result of the LBT time duration indicates that the carrier frequency is occupied during the terminal portion of the first subframe duration.

In yet another embodiment, a method for base station is provided wherein the base station creates a subframe structure used in communication between the base station and a user equipment (UE). The subframe structure comprises a plurality of subframes that each have a subframe duration. This embodiment, the base station operator serving cell on a carrier frequency. The base station performs a listen before talk (LBT) on the carrier frequency for a time duration during at least a first portion of a first subframe wherein the first portion of the first subframe occurs during a terminal portion of the first subframe and possibly during at least a second portion of a second subframe, wherein the second portion of the second sub frame occurs at the beginning of the second subframe and wherein the second subframe occurs immediately after the first subframe. The base station then determines a position of a starting OFDM symbol for transmitting a control channel in the second subframe of the plurality of subframes based on the time duration of the LBT. Also this embodiment the second subframe has a second subframe duration that occurs immediately after the subframe duration of the first subframe.

In various variations of this embodiment the position of the starting OFDM symbol may be determined by determining that the position of the starting OFDM symbol is at an initial OFDM symbol position in the second subframe when the result of the LBT indicates that the carrier frequency became unoccupied during a terminal part of the first portion of the first subframe. Determining the position of the starting OFDM symbol may also include determining that the position of the starting OFDM symbol is that and eighth OFDM symbol position in the second subframe when the result of the LBT that the carrier frequency became unoccupied during the second portion of the second subframe. Here the second portion of the second subframe may comprise the initial through the seventh OFDM symbol positions of the second subframe and wherein the second subframe comprises fourteen OFDM symbol positions. In some embodiments the base station also transmits the control channel starting from the determined position of a starting OFDM symbol.

Additionally in various embodiments the base station performs physical downlink shared channel (PDSCH) transmissions to the UE in the first subframe using the first UE-specific reference signal pattern when the duration of the first portion is not greater than the duration of the last three OFDM symbols of the first subframe. The base station may also perform PDSCH transmission to the UE in the first subframe using a second UE-specific reference signal pattern when the duration of the first portion is greater than the duration of the last three OFDM symbols of the first subframe.

In some embodiments the first UE-specific reference signal pattern is a UE-specific reference signal pattern used for the LTE frame structure type 2 (TDD) special subframe configurations 3, 4, 8, or 9; And wherein the second UE-specific reference signal pattern is a UE-specific reference signal pattern used for LTE frame structure type 2 (TDD) special subframe configurations 1, 2, 6 or 7.

Yet another embodiment of the invention provides a method for base station to make a transmission between the base station and a UE on an unlicensed carrier frequency. Here an exemplary method comprises the base station operating a first serving cell on a licensed carrier frequency and a second serving cell on an unlicensed carrier frequency. The base station performs a listen before talk (LBT) on the unlicensed carrier frequency for a first time duration. The base station then determines whether the unlicensed carrier frequency is free based on the LBT results. The base station may then transmit an activation command on the first serving cell for receipt by the UE. The activation command is configured to activate the UE so that it receives transmissions from the base station on the second serving cell. The base station may also transmit, after determining that the unlicensed carrier frequency is free, a reserve transmission on the unlicensed carrier frequency at least until the base station begins transmission of the activation command on the first serving cell.

In some embodiments the base station prepares the activation command while transmitting the reserve transmission on the unlicensed carrier frequency. Additionally in some embodiments, the base station also schedules data to be transmitted to the UE on the unlicensed carrier frequency for determined number of subframes. The base station will discontinue transmission of scheduled data to the UE after determined number of subframes and then perform another LBT on the unlicensed carrier frequency for a second time duration.

In yet another embodiment, a UE is configured to receive a subframe structure that is used for communication from a base station to the UE. In this embodiment the UE comprises a transceiver that's configured to receive a subframe in a subframe structure, where in the subframe structure comprises a first time slot comprising a first plurality of orthogonal frequency division multiplexed (OFDM) symbols and a second time slot comprising a second plurality of OFDM symbols, wherein the first time slot and the second time slot are non-overlapping. The UE further includes a processor that is configured to monitor for downlink control information in a first set of control channel elements (CCEs) within the first (m1) ($1 \leq m1 \leq 3$) OFDM symbols of the first time slot, where (m1) is an integer. The processor is further configured to monitor for downlink control information in a second set of control channel elements (CCEs) within the first (m2) ($1 \leq m2 \leq 3$) OFDM symbols in the second time slot, where (m2) is an integer. Additionally the processor is also configured to determined downlink control information from one of the first or second sets of CCEs.

FIG. 1 illustrates a communication system 100 including a network 102, a base station 104, such as an eNB, and a user equipment (UE) 106. The base station may also be referred to as a base unit, an access point (AP), access terminal (AT), Node-B (NB), enhanced Node-B (eNB), relay node, home eNB, pico eNB, femto eNB or by other present or future terminology used in the art for a base station derivation. Various communication devices may exchange data or information through the network 102. The network 102 may be an evolved universal terrestrial radio access (E-UTRA) or other type of telecommunication network. A network entity, such as the base station 104, may assign a UE identifier (UEID) to the UE 106 when the UE 106 first joins the network 102. For one embodiment, the base station 104 may be a distributed set of servers in the network 102. The UE 106 may be one of several types of handheld or mobile communication devices, such as, a mobile phone, a laptop, or a personal digital assistant (PDA). In one embodiment, the UE 106 may be a wireless local area network capable device, a wireless wide area network capable device, or any other wireless device.

Figure 2:
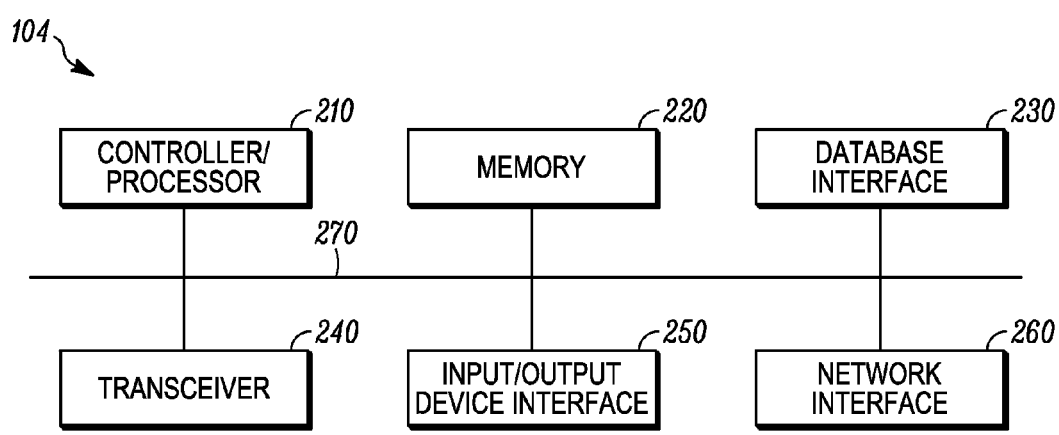
FIG. 2 illustrates a possible configuration of a computing system to act as a base station.

FIG. 2 illustrates a possible configuration of a computing system to act as the base station 104. The base station 104 may include a processor/controller 210, a memory 220, a database interface 230, a transceiver 240, input/output (I/O) device interface 250, and a network interface 260, connected through bus 270. The base station 104 may implement any operating system, such as Microsoft Windows®, UNIX, or LINUX, for example. Client and server software may be written in any programming language, such as C, C++, Java or Visual Basic, for example. The server software may run on an application framework, such as, for example, a Java® server or .NET® framework.

The controller/processor 210 may be any programmable processor. Various embodiments of the disclosure may also be implemented or partially implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein may be used to implement the decision support system functions of this disclosure.

The memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc-read only memory (CD-ROM), digital video disc-read only memory (DVD-ROM), DVD read write input, tape drive, solid state drive or other removable memory device that allows media content to be directly uploaded into the system. Data may be stored in the memory 220 or in a separate database (not specifically shown). The database interface 230 may be used by the controller/processor 210 to access the database. The database may contain any formatting data to connect the UE 106 to the network 102. The transceiver 240 may create a data connection with the UE 106. The transceiver 240 may configure a Physical Downlink Control Channel (PDCCH) and a Physical Uplink Control Channel (PUCCH) between the base station 104 and the UE 106.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network 106. The network connection interface 260 may be used to connect a client device to a network. The network connection interface 260 may be used to connect the teleconference device to the network connecting the user to other users in the teleconference. The components of the base station 104 may be connected via an electrical bus 270, for example, or linked wirelessly.

Client software and databases may be accessed by the controller/processor 210 from memory 220, and may include, for example, database applications, word processing applications, as well as components that embody the decision support functionality of the present disclosure. The base station 104 may implement any operating system, such as Microsoft Windows®, LINUX, or UNIX, for example. Client and server software may be written in any programming language, such as C, C++, Java or Visual Basic, for example. Although not required, the disclosure is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
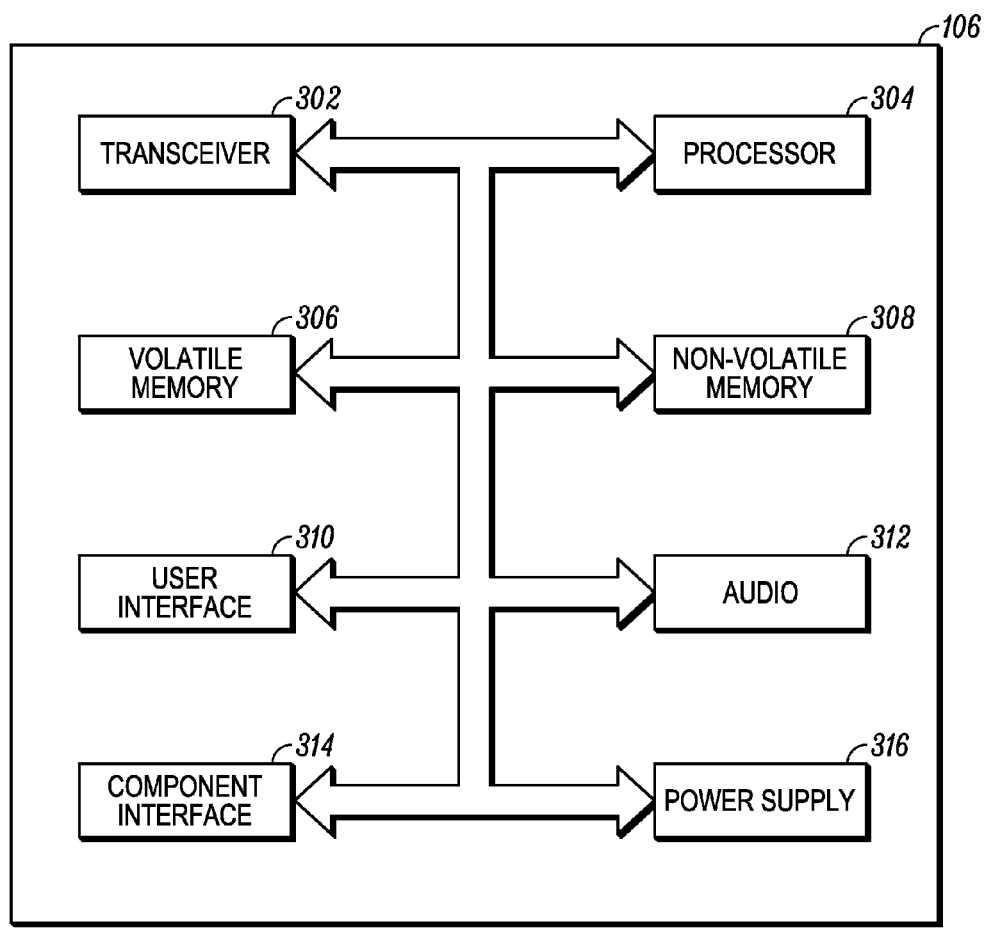
FIG. 3 is a block diagram of an embodiment of a telecommunication apparatus or electronic device that operates as a User Equipment (UE)

FIG. 3 illustrates in a block diagram of one embodiment of a telecommunication apparatus or electronic device to act as the UE 106. The UE 106 may be capable of accessing the information or data stored in the network 102. For some embodiments of the disclosure, the UE 106 may also support one or more applications for performing various communications with the network 102. The UE 106 may be a handheld device, such as, a mobile phone, a laptop, a personal digital assistant (PDA) smart phone or other multi-function communication device. For some embodiments, the UE 106 may be WiFi capable device, which may be used to access the network 102 for data or by voice using VOIP and WiFi carrier frequency spectrums.

The UE 106 may include a transceiver 302, which is capable of sending and receiving data over the network 102. The UE 106 may include a processor 304 that executes stored programs or applications that may, among other things, monitor, control and interact with the other components of the UE 106. The UE 106 may also include a volatile memory 306 and a non-volatile memory 308 which are used by the processor 304. The UE 106 may include a user interface 310 that may comprise user input elements such as a keypad, display, touch screen, and the like. The user interface 310 may also include user output elements that may comprise a display screen and/or vibration and illumination indicators. The UE 106 may also include an audio interface 312 that may comprise elements such as a microphone, earphone, and speaker. The UE 106 also may include a component interface 314 to which additional elements may be attached, for example, a universal serial bus (USB) interface. The UE 106 may include a power supply 316. In addition, the UE may be incorporated as a peripheral or integral part of a larger system such as a transportation vehicle, building, entertainment center, kiosk, or gaming device to name a few.

In Long Term Evolution (LTE) communication systems, physical layer signals and channels (e.g., a control channel like a physical downlink control channel (PDCCH), enhanced physical downlink channel (EPDCCH); a data channel like a physical downlink shared channel (PDSCH); reference and synchronization signals like a primary synchronization signal (PSS), secondary synchronization signal (SSS), cell-specific reference signal (CRS), channel state information reference signal (CSI-RS), and discovery signals are transmitted by a base station 104 using orthogonal frequency-division multiplexed (OFDM) symbols. For normal cyclic prefix (CP) operation, the OFDM symbols are of ~71 us in duration. Seven OFDM symbols may comprise a 0.5 ms slot and two slots may comprise a 1 ms LTE subframe. Therefore, an example of an LTE subframe comprises 14 OFDM symbols.

In order to enable efficient secondary serving cell (Scell) operation on an unlicensed carrier frequency, it is beneficial for the base station or eNB 104 to not use some of the symbols or portions of the symbols in (i.e., to truncate some of the symbols or portions of the symbols) the transmission of physical layer signals or channels in some of the subframes such that they comprise less than 14 symbols, but still utilize the truncated portion of the subframe (i.e., the remaining portion of the subframe where the symbols are not being used) to perform a listen before talk (LBT) function or as an idle period.

Figure 4A:
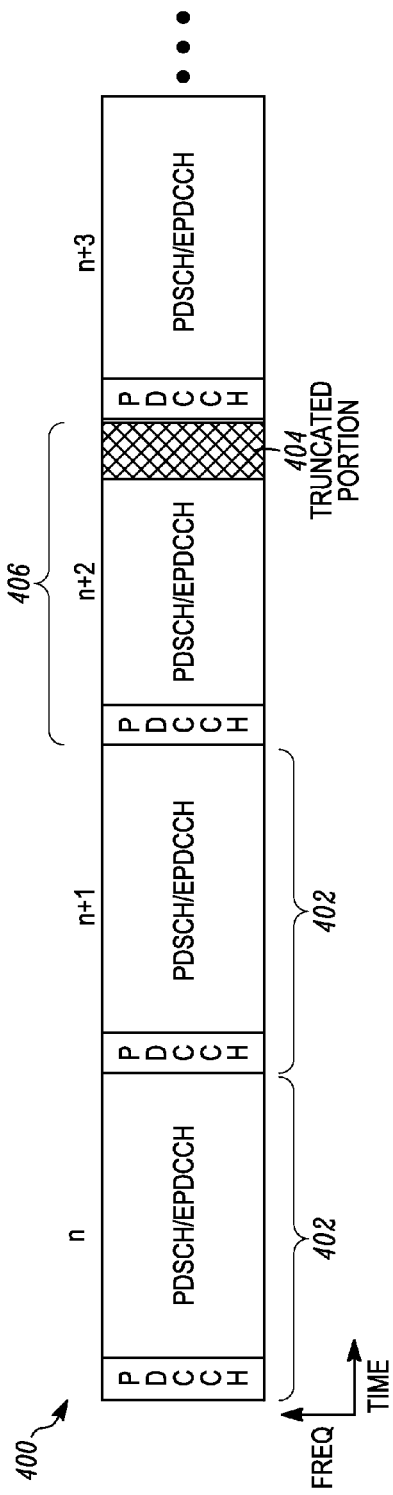
FIG. 4A illustrates an example of a subframe structure having a subframe with a truncated portion used for communication between a base station and a UE.
Figure 4B:
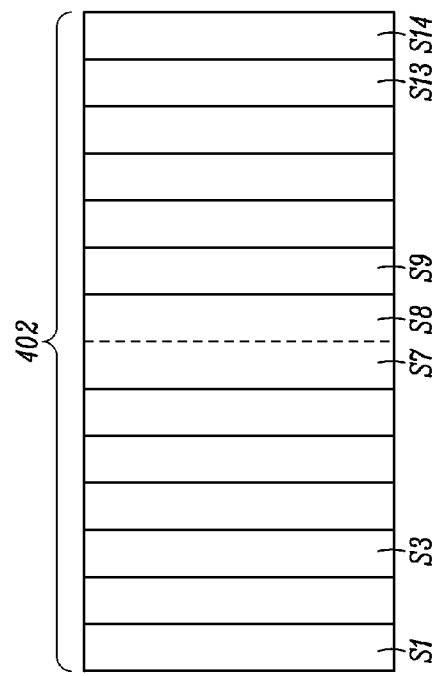
FIG. 4B illustrates an example of the (n) subframe of FIG. 4A showing S1 through s14 OFDM symbols during the subframe time duration.

For example and referring to FIG. 4A, a subframe structure 400 used for communication between an eNB 104 and a UE 106 is shown. In this example, each subframe 402 comprises 14 symbol positions (s1-s14) shown in FIG. 4B. In some embodiments, after every continuous transmission of 2 subframes (e.g., subframes (n) and (n+1)), the eNB can truncate the transmission of the $3^{rd}$ subframe (n+2) 406 to be 11 symbols long and use the remaining truncated portion 404 (i.e., 3 truncated symbols) to perform LBT. Alternately in other embodiments, after every continuous transmission of, for example, 5 subframes, the eNB can truncate the transmissions of, for example, the $6^{th}$ subframe to 9 symbols and use the remaining 5 symbols to perform LBT. Alternatively, in other embodiments, after every continuous transmission of, for example, 11 continuous subframes, the eNB can truncate the transmission of the $12^{th}$ subframe to be, for example, 5 symbols long and use the remaining truncated portion of 9 symbols to perform LBT. These example transmission approaches may be consistent with requirements for load based equipment transmission in ETSI EN 301 893 specification.

In various embodiments, the eNB 104 may use some or the entire truncated portion 404 of the subframe with truncation 406, for example (n+2), to perform LBT. The eNB 104 may also use some part of the truncated portion 404 of the subframe with truncation 406 as an idle period (e.g., the duration of the idle period may be similar to the DIFS period described in IEEE 802.11 specifications). After the eNB 104 performs LBT and determines that the carrier is free, the eNB 104 may also use some part of the truncated portion 404 of the subframe with truncation 406 to transmit a 'carrier holding signal' or 'carrier busy signal' until the next LTE pilot/data/control transmission can begin to ensure that other devices sensing the carrier detect that the carrier is occupied by the eNB and defer their transmissions (not specifically shown). The 'carrier holding signal' may be transmitted with the same power level or PSD level as the subsequent LTE pilot/data/control transmission. The 'carrier holding signal' may be a narrowband signal or a wideband signal and may/may not be centered within the operating channel on the unlicensed carrier frequency.

From a UE 106 perspective, it is beneficial for the UE 106 to be able to determine or to be provided information defining which of the received subframes in the subframe structure 400 are subframes with truncated transmissions 406 and the number (m) of OFDM symbols truncated in the truncated portion 404 of the subframes with truncation 406. If this information is not made available to the UE, the UE may attempt to receive the signals/channels transmitted by the eNB in a manner that assumes that the subframes therein do not have any truncation, which will lead to estimation/decoding errors that will cause retransmissions and inefficient carrier usage.

Subframes with truncation 406 are typically done only after continuous transmission of a certain number of subframes 402. The number of subframes continuously transmitted prior to a subframe with truncation 406 depends on the transmission activity of the eNB 104, which in turn depends on the data arrival patterns for various UEs served by the eNB. Given this, the subframes with truncation 406 may not follow a periodic pattern in some embodiments. Further, the subframes that are subframes with truncation may also be impacted by the variability of the duration of the idle period or LBT observation period due to, e.g., random backoff when the carrier is detected as being occupied. Also, the number of symbols in the truncated portion 404 in a given subframe with truncation 406 can vary depending on operating parameters chosen by the eNB 104. After considering these aspects, the following approaches are possible techniques or methods for providing signaling to a UE 106 to indicate which subframe(s) is a subframe with truncation and what portion of the subframe(s) with truncation is the truncated portion.

Still referring to FIG. 4A, a first example of an approach for signaling a UE 106 to indicate that there are subframes with truncation is for the UE to be configured by higher layers (e.g., a radio research control (RRC) message) with a set of values wherein each value corresponds to a number of truncated symbols at the end of a subframe with truncation. When the UE 106 is assigned a PDSCH in a subframe and when that subframe is a subframe with truncation 406, the number of symbols (m) in the truncated portion 404 of that subframe with truncation is indicated in the associated downlink control information (DCI, which may be part of the PDCCH), that assigns the PDSCH. For example, the set of symbols s={0, 3, 5, 9} can be configured by higher layers such that two bits in the DCI can signal one of the four values {0, 3, 5, 9} as being the number of symbols (m) in the truncated portion 404. In another example, a set {0, 3} can be configured by the eNB such that one bit in the DCI indicates whether the subframe is not truncated {0} or has a truncated portion of 3 symbols (m=3). In yet another example, one bit can be configured in the DCI to indicate whether the subframe is or is not a subframe with truncation. Additionally the UE can be configured by higher layers (e.g., a RRC message) with a truncated symbol value corresponding to the number of truncated symbols that are part of the truncated portion at the end of a subframe with truncation. When symbols are truncated, the truncated portion is comprised of contiguous or a set of serial symbols.

A second example of an approach or method for signaling a UE 106 for subframes with truncation 406 can be performed with a physical downlink control channel (PDCCH) or an enhanced physical downlink control channel (EPDCCH). Here the DCI contents of a PDCCH/EPDCCH transmitted in the common search space of the primary cell (Pcell, i.e., a cell operating on the licensed carrier) indicate the number of symbols in the truncated portion of the corresponding subframe with truncation of the Scell (operating on the unlicensed carrier). In this approach, the PDCCH/EPDCCH can be decoded by all UEs and/or a set of UEs operating on the unlicensed carrier. A special radio network temporary identifier (RNTI) may be configured via higher layers for scrambling the cyclic redundancy check (CRC) of the associated DCI.

In a variant of the second example, the DCI contents of a PDCCH/EPDCCH transmitted in the UE-specific search space/carrier-specific search space of another cell (e.g., a primary or secondary cell operating on the licensed carrier) indicate the number of symbols that are truncated (i.e., a truncation value) in the truncated portion at the end of the subframe (i.e., the terminal part of the subframe) in the corresponding subframe with truncation of the Scell (operating on the unlicensed carrier). In this approach, the PDCCH can be decoded by multiple UEs operating on the unlicensed carrier for which the DCI is intended.

A third example of an approach or method for signaling a UE that certain subframes are subframes with truncation and indicate which symbols of the subframe with truncation are truncated as part of the truncated portion can be accomplished as follows. Instead of indicating the truncation value, the higher layers configure the UE with one or more subframe types, each subframe type may correspond to a subframe having a predetermined number of symbols in the subframe, e.g., subframe type 1 corresponds to 14 OFDM symbols (i.e., 1 ms duration) and using a first type of reference signal structure, and subframe type 2 corresponds to 11 OFDM symbols (11/14 ms duration) corresponding to a subframe with truncation having a truncated portion of 3 ODFM symbols and using a second type of reference signal structure, and so on.

In some scenarios, it is not possible for the eNB to truncate only the last symbols (i.e., the terminal portion) of a subframe with truncation. For example, if the eNB begins a LBT clear channel assessment in the last symbols of a subframe with truncation (e.g., due to limitation on the maximum channel occupancy time), and if the carrier is not detected as free until sometime in the next subframe (i.e., the subframe immediately following a first subframe with truncation), then the eNB can only start LTE transmission somewhere in the middle of the next subframe.

Figure 5:
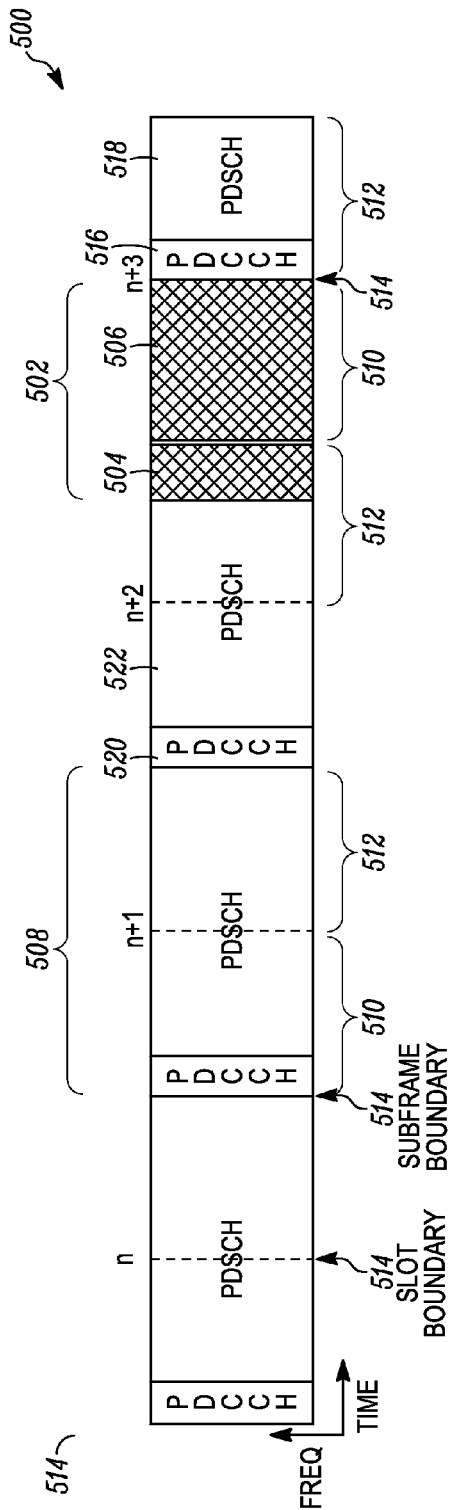
FIG. 5 illustrates another subframe structure having a truncated portion during a terminal portion of one subframe and during a first slot portion of the following subframe.

FIG. 5 illustrates another subframe structure 500 used for communication between a base station and a UE. Here the end or terminal portion 504 of subframe n+2 and some of the beginning portion of subframe (n+3) are truncated by the eNB into the truncated portion 502. In such a scenario it is not possible for the eNB to indicate which symbols are truncated symbols in the beginning portion 506 of subframe (n+3) via control signaling 520 in subframe n+2 (because eNB will not know how long the LBT will take) or the control signaling in subframe (n+3) (because the LBT occurs before the subframe (n+3) signaling).

One option for the eNB 104 in this scenario is to truncate or not transmit in the entire subframe (n+3) and then begin PDCCH/PDSCH transmission in the following subframe after subframe (n+3) (i.e., subframe (n+4)). The eNB may use some part of the truncated portion of subframe (n+3) to transmit a 'carrier holding signal' after the carrier is detected to be free in the truncated portion. However, this option is inefficient as all resources in subframe (n+3) are wasted (especially if truncation is required only for a few beginning symbols of subframe (n+3)).

A more efficient option is to initiate control signaling transmission in subframe (n+3) after the eNB determines that the carrier is free. With this option, if the eNB uses PDCCH to assign PDSCH resources to a UE in subframe (n+3), and if some or all of the symbols of the first slot 510 of the subframe (n+3) have to be truncated (e.g., due to an ongoing LBT), then the eNB can transmit the PDCCH 516 starting from the first symbol of the second slot 512. In this example, each subframe 508 in the subframe structure 500 comprises 14 symbols wherein the first slot 510 of a subframe 508 contains the first 7 symbols (s1-s7) and the second slot 512 of the subframe 508 contains the second 7 symbols (s8-s14). A slot boundary 514 is shown as a dashed horizontal line in each subframe 508.

FIG. 5 illustrates subframe (n+3) where PDSCH 518 is transmitted in the symbols in a second slot following PDCCH 516 because the first slot 510 of the (n+3) subframe is part of the truncated portion 506 at the beginning of subframe (n+3).

Alternatively, in some circumstances PDSCH may span both symbols in the second slot 512 of a first subframe with truncation (n+2) and some symbols (e.g., the last two symbols or at least some symbols following the instant in time when the carrier is detected to be free towards the end of the first slot) in the first slot of a second subframe with truncation (n+3) that immediately follows the first subframe with truncation (n+2). For example, if the first 5 symbols in the first slot 510 of the second subframe with truncation (n+3) are truncated, PDCCH 516 is transmitted in the first symbol of the second slot 512 (i.e., the s8 symbol position in the second subframe with truncation (n+3)) and PDSCH 518 is assigned in the last two symbols of the first slot ($6^{th}$ and $7^{th}$ symbol positions s6 and s7) of the second subframe with truncation (n+3) and symbols in the second slot 512 of the second subframe with truncation (n+3). This alternative has the advantage of utilizing the subframe resources a little more efficiently (assuming the first 5 symbols (m=5 and s=s1 through s5) of the subframe are enough for truncation) and it is more suitable for PDSCH assignments for transmission modes 8, 9, 10 that utilize demodulation reference signals present in the s6 and s7 symbol positions of the first slot of the subframe.

Additional efficiency may be provided wherein, the DCI of the PDCCH 516 in the subframe with truncation (n+3) can also indicate the number of truncated symbols in that subframe at the beginning of the subframe with truncation (n+3) so that PDSCH 518 is transmitted according to DCI (e.g., if DCI indicates 3 symbols (s1-s3), PDSCH 518 can be transmitted in the remaining 11 symbols (s4-s14)).

From a UE perspective, a UE typically monitors for PDCCH candidates in the first few symbols in the first slot 510 of a subframe 508 where monitoring implies attempting to blindly decode a PDCCH candidate assuming a particular set of CCEs (control channel elements) within the UE's PDCCH search space.

However, for the alternatives described above, the UE has to monitor for PDCCH candidates in the first few symbols of both the first slot 510 and the second slot 512 of each subframe 508. More specifically, the UE performs b1 blind decodes (BDs) in one or more symbols at the beginning of the first slot of a subframe with truncation and b2 additional BDs in one or more symbols at the beginning of the second slot of the subframe with truncation (b1 and b2 are integers).

The UE may perform the additional b2 BDs only if the first b1 BDs are not successful. For this operation, the UEs PDCCH search space comprises two parts, the first part comprising PDCCH candidates assuming sets of CCEs within the first m1 symbols ($1 \le m1 \le 3$) of the first slot of the subframe with truncation and a second part comprising sets of CCEs within the first m2 symbols ($1 \le m2 \le 3$) of the second slot of the subframe with truncation.

To indicate the span (i.e., the number of symbols) of PDCCH 516 transmission in the second slot, the eNB can also transmit a PCFICH in the first symbol of the second slot of the second subframe with beginning truncation (n+3). Alternatively, the span of PDCCH in the second slot 516 can be fixed or configured (e.g., signaled by higher-layers (e.g., a RRC message)) to 1 or 2 symbols (m=1 or 2) to reduce UE complexity. In addition to PDCCH and PCFICH, PHICH may also be transmitted at the beginning of the second slot 512 of the subframe with beginning truncation (n+3). The RE (resource element) locations for PCFICH can follow the same mapping as that of existing LTE specifications (except for the change from first slot to second slot). Alternatively, additional higher layer signaling may help the UE determine the PCFICH and PDCCH RE locations. The PHICH configuration is signaled in PBCH for the existing specifications, whereas the PHICH for second slot may be separately configured.

For the purpose of PDCCH decoding, and PDSCH RE mapping (if PDCCH with PDSCH assignment for the UE is detected), the UE may assume that CRS is present in the second slot 512 of the subframe with truncation (n+3) even if that subframe with truncation is configured as an MBSFN subframe.

Figure 6:
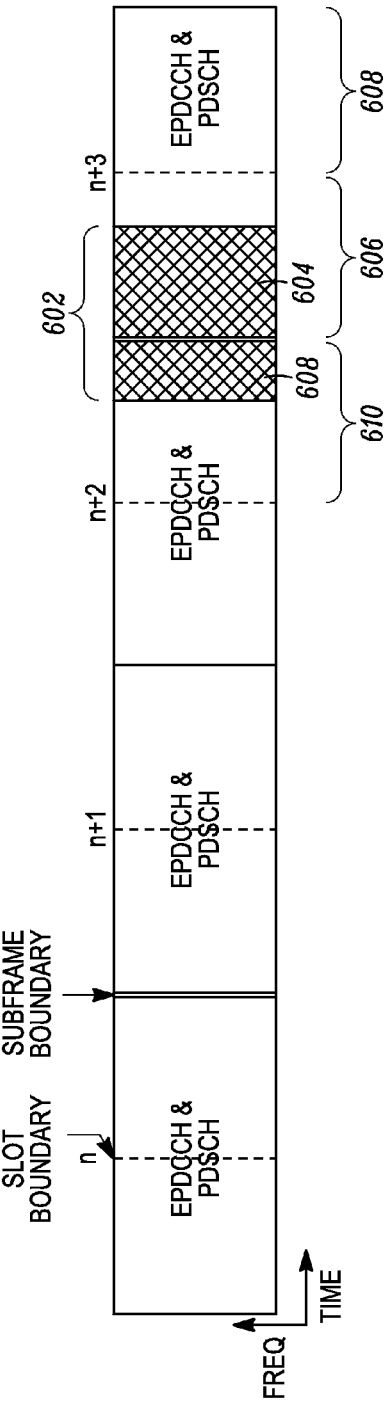
FIG. 6 illustrates another subframe structure having a truncated portion during a terminal portion of one subframe and during a portion of a first slot of the following subframe.

Referring now to FIG. 6, if the eNB 104 uses EPDCCH to assign PDSCH resources to a UE in subframe (n+3), and if some or all of the symbols of the first slot 606 of the subframe (n+3) have to be truncated (e.g., due to ongoing LBT), then the eNB can transmit the EPDCCH starting from an alternative OFDM symbol location 607 that begins after the truncation period 602.

In principle, the starting symbol for EPDCCH transmission in subframe (n+3) can be dynamically varied by the eNB based on length of the beginning portion 604 truncation period, at the beginning of the subframe with truncation (n+3). However, this would result in very high UE complexity (since UE has to blindly try all possible starting locations).

A simpler alternative is for the eNB 104 to signal one additional EPDCCH starting location to the UE 106 via RRC signaling if necessary. In current LTE systems, the EPDCCH starting symbol location is signaled to the UE via RRC (e.g., it can be $2^{nd}$, $3^{th}$, $4^{th}$ symbol in the first slot for a 20 MHz carrier). In various embodiments, the eNB will additionally configure the UE with an additional EPDCCH starting location (e.g., $5^{th}$, 6th or $7^{th}$ symbol of the first slot 606, or the first symbol of second slot 608) to accommodate alternative EPDCCH transmission if the first few symbols of the first slot 606 of the subframe with beginning truncation (n+3) are truncated.

An even simpler alternative (albeit less efficient than the above two examples) comprises transmitting EPDCCH starting from the first symbol of the second slot 608 if a higher layer configured starting symbol (in the first slot 606) has to be truncated.

In various embodiments, PDSCH can be transmitted from the same starting location as that of EPDCCH or DCI of the EPDCCH, and can indicate the number of truncated symbols at the beginning of the subframe with truncation (n+3) so that PDSCH is transmitted according to DCI (e.g., if DCI indicates 3 truncated symbols, PDSCH can be transmitted in the remaining 11 symbols).

From a UE perspective, the UE performs b1 BDs assuming a first EPDCCH starting position configured by higher layers, and performs b2 additional BDs assuming an alternative EPDCCH starting position in a subframe. (Here b1 and b2 are integers.) The UE may perform the additional b2 BDs only if the first b1 BDs are not successful. The alternative EPDDCH starting position in a subframe may be fixed (e.g., the s6 symbol position of first slot of each subframe), or it may be configured via RRC.

In another embodiment, the UE performs b1 BDs assuming EPDCCH is contained within the $1^{st}$ slot, performs b2 additional BDs assuming EPDCCH is contained within the $1^{st}$ and $2^{nd}$ slot, and b3 BDs for EPDCCH contained within only $2^{nd}$ slot. (Here b1, b2 and b3 are each integers.) This is useful for cases where the UE does not know if the subframe with truncation has a truncated portion at the beginning or the end of the subframe, i.e., the eNB has the flexibility to schedule the UE in $1^{st}$ slot only, $2^{nd}$ slot only or $1^{st}$ and $2^{nd}$ slot together.

If the beginning portion of a subframe has to be truncated (e.g., as shown in subframe (n+3) in FIG. 5), another alternative is for the eNB 104 to indicate the truncated beginning portion 506 of a given subframe with truncation (n+3) in the next subframe (n+4). For example, when the first few beginning symbols of subframe (n+3) shown in FIG. 5 are truncated, then instead of making the UE determine the starting symbol of control channel transmission 516 in subframe (n+3) via the blind decoding approaches described above, the eNB can signal the truncation information for subframe (n+3) using DCI of a PDCCH/EPDCCH transmitted in subframe (n+4) (not specifically shown). The DCI should have additional information indicating that the truncation information applies to the previous subframe (i.e., subframe n+3) and not the current subframe (n+4). This can be provided by a subframe indicator bit(s) in the DCI of subframe (n+4), or by using a configured cross-subframe RNTI. The DCI can also provide resource allocation information for the previous subframe (i.e., subframe n+3).

In current LTE systems, for receiving PDSCH transmissions for some transmission modes (e.g., TM 8, 9, or 10), the UE uses UE-specific demodulation reference signals (UERS) present in REs of the last two symbols of a subframe for LTE frame structure type 1 (FDD). However, for LTE operation on unlicensed carriers, in subframes where the last two or more symbols are truncated, these UERS will be unavailable to the UE, and utilizing only the remaining UERS in other non-truncated symbols will result in degraded channel estimation. Embodiments solve this problem by providing a more efficient alternative. That is, for LTE frame structure type 1 (FDD), for transmitting UE-specific reference signals for antenna ports 7, 8, 9 and 10:

(1) if the eNB has to provide a subframe with truncation wherein only the last three or fewer symbols in an end portion 608 in a subframe with truncation (n+2) are truncated using normal cyclic prefix (CP), then for those subframes, the eNB uses the UE-specific reference signals pattern described for LTE frame structure type 2 (TDD) special subframe configurations 3, 4, 8, or 9 in the 3GPP TS 36.211 vc.2.0 specification.

(2) if the eNB has to truncate more than last three symbols in the second slot 610 of a subframe with truncation (n+2) using normal CP, then for that subframe with truncation (n+2), the eNB uses the UE-specific reference signals pattern described for LTE frame structure type 2 (TDD) special subframe configurations 1, 2, 6, or 7 in the 3GPP TS 36.211 vc.2.0 specification.

This alternative is efficient as the UERS pattern for (TDD) special subframe configurations 3, 4, 8, or 9 in the 3GPP TS 36.211 vc.2.0 specification does not include REs in the last three symbols of the subframe. Similarly, the UERS pattern for (TDD) special subframe configurations 1, 2, 6, or 7 does not include REs in the second slot of the subframe.

The CSI-RS transmissions can also adapted to fit into the subframes with truncation. The OFDM symbols in which CSI-RS are transmitted are configured via higher layers. If an OFDM symbol in which CSI-RS is to be transmitted corresponds to a truncated OFDM symbol, then the UE may assume that the CSI-RS is not transmitted in the OFDM symbol. In another approach, the CSI-RS configuration for truncated subframes may be configured via separate higher layer signaling.

In existing LTE systems Scells are typically operated on a carrier (also sometimes referred as a 'component carrier' or a 'channel') using the following states:

(1) State where the carrier is not added as Scell ("not configured" state):

Here the UE may be configured to perform inter-frequency measurements on the carrier frequency layer using measurement gaps. No additional power consumption is necessary due to Scell receiver. The Scell receiver need not be turned on and measurements can be performed using the Pcell receiver.

(2) State where the carrier is added as Scell but not activated ("deactivated state"):

Here the UE receives relevant system information for the Scell from the Pcell. The UE may be configured to perform measurements on the Scell without measurement gaps. There will be minimal additional power consumption due to Scell receiver. The Scell receiver needs to be occasionally turned on (e.g., for 5 ms every 160 ms) for RRM measurements using either CRS or Discovery signals (3) State where the carrier is added as Scell and activated ("activated state"):

Here the UE is expected to receive PDSCH on the Scell in all activated subframes. There is high additional power consumption due to the Scell receiver. Scell receiver should perform PDCCH monitoring in every subframe (for self scheduling case). The Scell receiver needs to buffer every subframe for potential PDSCH processing (for both self and cross-carrier scheduling cases)

For Scell operation on unlicensed carriers, it is desirable to retain the above states so that UE power consumption for unlicensed carrier operation is similar to that of licensed carrier operation.

However, it should be noted that some of the embodiments, when compared to current LTE operation, are further required to enable efficient operation taking into account the need for the eNB to perform LBT and obey discontinuous transmission requirements (DCT requirements).

Figure 7:
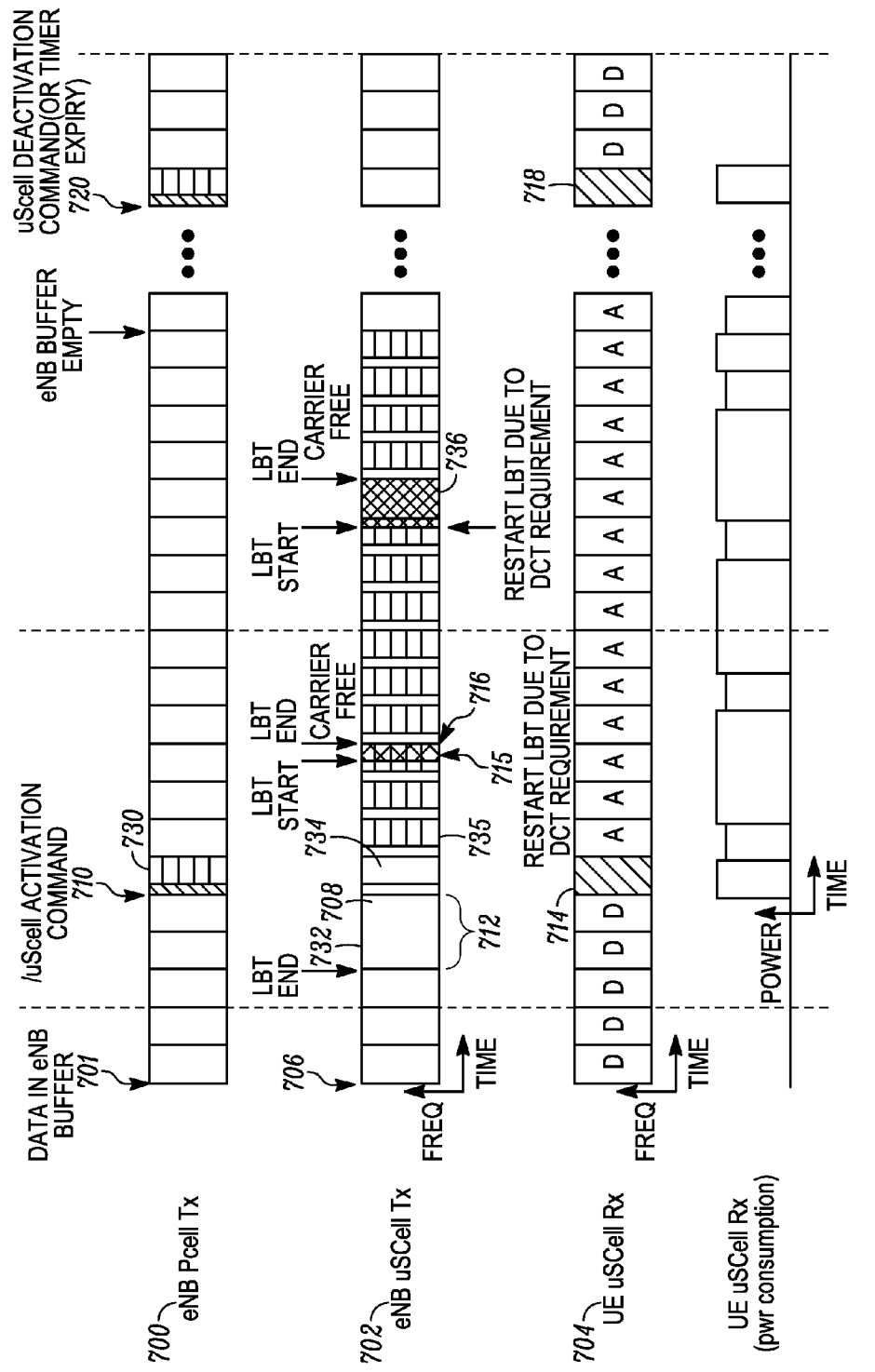
FIG. 7 illustrates and example of Scell operation on an unlicensed carrier frequency.

FIG. 7 illustrates an example of Scell operation on an unlicensed carrier frequency. In FIG. 7, the eNB operates (i.e., performs the necessary steps to communicate with a UE) a Pcell 700 on a licensed carrier. The eNB also operates a Scell 702 (denoted as uScell in FIG. 7) on an unlicensed carrier. The UE receives transmissions from the eNB on both the Pcell and uScell 704 (only uScell reception is shown). Subframes indicated as "D" represent deactivated state subframes for the UE. Subframes indicated as "A" represent activated state subframes for the UE.

When a data burst to be transmitted on the uScell arrives in the eNB buffer 701, the eNB starts LBT 706 on the unlicensed carrier. After determining that the carrier is free 708, the eNB starts transmitting 712 a reserving transmission on the unlicensed carrier to effectively reserve the unlicensed carrier frequency. The reserving transmission is made to ensure that other devices sensing the carrier detect that the carrier is occupied by the eNB. It also prepares an activation command 710 for transmission on the PCell to the UE. When the eNB is ready to transmit the activation command (e.g., after a one or two subframe delay for internal processing, two subframe delay shown in the figure), it transmits the activation command 710 on the Pcell. The UE, after receiving the activation command 710, transitions to an unlicensed carrier frequency receive activated state A from its deactivated unlicensed carrier receive state D. The UE may need a few subframes (e.g., 1 or 2 subframes, 1 subframe shown in the figure) to make this transition 714. Once the UE is in activated state, the eNB schedules data (using PDSCH) to the UE. After transmitting for a few subframes (e.g., 5 subframes shown in the figure), the eNB stops transmission and reinitiates LBT 715 on the unlicensed carrier to satisfy DCT requirements. After the carrier is determined to be free 716, the eNB reinitiates PDSCH transmission to the UE. This process is continued till the data burst transmission is complete.

Preparation of activation command at the eNB includes determining DCI payload bits, CCE locations and CCE aggregation level of the PDCCH associated with the activation command. Some of the steps for preparing the activation command can be performed in advance by the eNB (e.g., determining payload bits). However, other steps (e.g., determining CCE locations for PDCCH transmission) can only be performed after determining the subframe where the activation command is transmitted 730, which in turn, depends on the subframe in which the eNB determines the unlicensed carrier is free 732. For example, if the eNB determines that the unlicensed carrier is free in subframe n, it prepares for activation command transmission on the Pcell in subframe (n+3). As explained earlier, between subframe (n) and (n+3), the eNB continues transmitting on the unlicensed carrier 712 to ensure that other devices sensing the carrier realize that the carrier is occupied by the eNB. The transmissions may include reference signal transmissions such as CRS or CSI-RS.

To shorten the UE transition 714 from deactivated D to activated A state, the activation command can be embedded in physical layer signaling (e.g., within the DCI payload of a PDCCH), instead of the higher layer MAC CE based approach (which involves both PDCCH and PDSCH used in current LTE systems.

The eNB has to transmit at least reference signals (e.g., CRS) on the unlicensed carrier in the subframe 734 where the activation command is transmitted and a few immediately following subframes (e.g., one subframe 735 following the activation command). These reference signals can be used by the UE (that is being activated) for purposes such as regaining fine time/frequency sync and automatic gain control (AGC) warm up.

From the UE perspective, it continues to be in activated state A until it receives a deactivation command from the eNB or the expiration of a deactivation timer configured by the eNB via higher layers (whichever occurs earlier) 720, after which the UE transitions 718 to the low power deactivated state.

As shown in the FIG. 7, for unlicensed carrier operation, the eNB may not have any transmissions in some subframes 736 (e.g., due to LBT procedure related delay) when the UE is in activated state. This is different from current LTE systems where activated UEs expect the eNB to transmit at least CRS in every subframe. The UEs need to receive frequent reference signal transmissions from the eNB (e.g., at least one transmission every X=10 or 20 ms) for AGC maintenance and fine time/frequency tracking.

For unlicensed carrier operation, the eNB may use any one of the following approaches to ensure that activated UEs have enough reference signals for AGC maintenance and fine time/frequency tracking. For example, in one embodiment for unlicensed carrier operation, the eNB may transmit discovery signals more frequently than what is considered standard. More particularly, the eNB may transmit discovery signals once every 10 ms to 20 ms. However this embodiment's approach may most likely lead to increased interference on the unlicensed carrier frequency and increased eNB power consumption since the transmitted discovery signals are typically always transmitted by the eNB to facilitate cell detection.

In another embodiment, when the eNB determines that it has not made any transmissions on an unlicensed carrier for some time (e.g., for about 10 to 20 ms), the eNB will not schedule PDSCH to an activated UE on that carrier, until the eNB transmits a few subframes (e.g., 1 or 2 subframes) containing at least reference signals (e.g., CRS), and then resume PDSCH transmissions to the UE thereafter. Here, the eNB may optionally send an indicator on the PCell (e.g., special PDCCH/EPDCCH message) that tells the UE whether reference signal transmissions (e.g., CRS) are present on the Scell for a particular subframe or a set of subframes.

In other embodiments for unlicensed carrier operation, the eNB and the activated UE can maintain a DL time synchronization timer. The DL time synchronization timer can be set to a value Xms (e.g., X=10 or 20 ms, the value of X depends on time for which UE can autonomously maintain time-frequency sync without receiving any eNB transmissions). The subframe in which the DL time synchronization timer is set to Xms can be any subframe in which the eNB transmits PDSCH to the UE (from UE perspective, it will be any subframe where PDSCH is received from the eNB). Alternately, the subframe can be any subframe where the UE transmits a positive acknowledgement (HARQ-ACK) in response to a PDSCH received from the eNB (in this case, from eNB perspective, it will be any subframe in which a positive acknowledgement is received from the UE). The DL time synchronization timer is then counted down in subsequent subframes. When the DL time synchronization timer expires (i.e., when it becomes 0), the eNB determines that the UE may not have fine time frequency synchronization. Although, the UE may not have fine time frequency synchronization, the UE can continue to monitor Scell subframes for control signaling, as it may be able to decode some PDCCH/EPDCCH and/or PDSCH messages (albeit with a higher bit error rate) When the eNB determines the UE may not have fine time frequency synchronization, the eNB can schedule PDSCH transmissions with a conservative PDSCH assignment (e.g., using MCS corresponding to QPSK and one spatial layer instead of 64 QAM and multiple spatial layers), for a few subframes (e.g., 1 or 2 subframes) until the UE regains fine time/frequency sync to decode more aggressive PDSCH assignments. This alternative avoids the overhead of re-activation command transmission on the PCell (described below). In the alternative, the eNB can send an activation command (in this example, a re-activation command) to the UE on the PCell. Upon reception of the activation command on the Pcell in subframe n, the UE determines that reference signal transmissions are present in at least subframes (n) to n+p (e.g., p=1 or 2) and regains fine time-frequency sync using the signals in those subframes.

In yet another embodiment for unlicensed carrier frequency operation, the eNB may also reuse a deactivation timer as a 'DL time synchronization timer' described above (i.e., the eNB configures the UE with a deactivation timer of Xms, and resends the activation command whenever the timer expires (if there is still data in the buffer for transmission to that UE)). In this embodiment situation, the UE deactivates the Scell when the timer (deactivation timer/DL time synchronization timer) expires.

Although the preferred embodiments have been described herein in detail, it should be understood that various changes, substitutions and alterations can be made therein without departing from the teachings, understanding and scope of the invention as defined by the appended claims.

What is claimed is:

1. A method for a user equipment (UE) to receive a subframe structure used for communication from a base station, the method comprising:
   receiving, by the UE, a subframe in the subframe structure, the subframe comprising a first time slot comprising a first plurality of orthogonal frequency-division multiplexed (OFDM) symbols and a second time slot comprising a second plurality of OFDM symbols, wherein the first time slot and the second time slot are non-overlapping;
   monitoring, by the UE, for downlink control information in a first set of control channel elements (CCEs) within the first (m1) (1≤m1≤3) OFDM symbols of the first time slot, where (m1) is an integer;
   monitoring, by the UE, for downlink control information in a second set of control channel elements (CCEs) within the first m2 (1≤m2≤3) OFDM symbols of the second time slot, where m2 is an integer; and
   determining, by the UE, resulting downlink control information from one of the first and second set of CCEs,
   wherein monitoring for downlink control information in the second set of CCEs is done only when the monitoring for downlink control information in the first set of CCEs fails to find downlink control information.

2. The method in claim 1, wherein the first plurality of OFDM symbols consists of seven OFDM symbols and the second plurality of OFDM symbols consists of 7 OFDM symbols.

3. The method of claim 1, wherein the base station is an enhanced Node-B (eNB).

4. The method of claim 1, wherein the downlink control information in the second set of CCEs is determined to be the resulting downlink control information when the subframe is a subframe with truncation that includes truncation of at least one of the first plurality of OFDM symbols in the first time slot.

5. The method of claim 1, wherein receiving further comprises receiving the subframe from a serving cell in an operating channel of an unlicensed frequency band.

6. The method of claim 1, wherein the resulting downlink control information from either the first set or the second set of CCEs comprises resource allocation information prescribing an allocation of resources for Physical Downlink Shared Channel (PDSCH) reception.

7. The method of claim 1, wherein when the resulting downlink control information is determined to be from the second monitoring, then the second set of CCEs comprises resource allocation information allocating resources in the second plurality of OFDM symbols in the second time slot.

8. The method of claim 1, wherein the determined resulting downlink control information is from the first monitoring of OFDM symbols in the first time slot and comprises resource allocation information prescribing an allocation of resources in another plurality of OFDM symbols in a second subframe, wherein the second subframe occurred immediately prior to the subframe.

9. The method of claim 1, wherein the determined resulting downlink control information is from monitoring downlink control information in the first set of the CCEs within the first OFDM symbols of the first time slot and wherein the resulting downlink control indication comprises an indication value that indicates that the subframe is a subframe with truncation and indicates a number of symbols in the truncated portion of the subframe.

10. A user equipment (UE) configured to receive a subframe structure used for communication from a base station, the UE comprising:
    a transceiver configured to receive a subframe in a subframe structure, wherein the subframe comprises a first time slot comprising a first plurality of orthogonal frequency-division multiplexed (OFDM) symbols and a second time slot comprising a second plurality of OFDM symbols, wherein the first time slot and the second time slot are non-overlapping;
    a processor configured to monitor for downlink control information in a first set of control channel elements (CCEs) within the first (m1) (1≤m1≤3) OFDM symbols of the first time slot, where (m1) is an integer;
    the processor being further configured to monitor for downlink control information in a second set of control channel elements (CCEs) within the first (m2) (1≤m2≤3) OFDM symbols of the second time slot, where (m2) is an integer; and
    the processor being further configured to determine downlink control information from one of the first or second set of CCEs,
    wherein the processor monitors for downlink control information in the second set of CCEs only when the monitoring for downlink control information in the first set of CCEs fails to find downlink control information.

11. The user equipment of claim 10, wherein the first plurality of OFDM symbols consists of seven OFDM symbols and the second plurality of OFDM symbols consists of 7 OFDM symbols.

12. The user equipment of claim 10, wherein the base station is an enhanced Node-B (eNB).

13. The user equipment of claim 10, wherein the downlink control information in the second set of CCEs is determined to be the resulting downlink control information when the subframe is a subframe with truncation that includes truncation of at least one of the first plurality of OFDM symbols in the first time slot.

14. The user equipment of claim 10, wherein the transceiver receives the subframe from a serving cell in an operating channel of an unlicensed frequency band.

15. The user equipment of claim 10, wherein the resulting downlink control information from either the first set or the second set of CCEs comprises resource allocation information prescribing an allocation of resources for Physical Downlink Shared Channel (PDSCH) reception.

16. The user equipment of claim 10, wherein when the resulting downlink control information is determined to be from the second monitoring, then the second set of CCEs comprises resource allocation information allocating resources in the second plurality of OFDM symbols in the second time slot.

17. The user equipment of claim 10, wherein the determined resulting downlink control information is from the first monitoring of OFDM symbols in the first time slot and comprises resource allocation information prescribing an allocation of resources in another plurality of OFDM symbols in a second subframe, wherein the second subframe occurred immediately prior to the subframe.

18. The user equipment of claim 10, wherein the determined resulting downlink control information is from monitoring downlink control information in the first set of the CCEs within the first OFDM symbols of the first time slot and wherein the resulting downlink control indication comprises an indication value that indicates that the subframe is a subframe with truncation and indicates a number of symbols in the truncated portion of the subframe.

* * * * *